(12) United States Patent
Okamoto et al.

(10) Patent No.: US 6,483,253 B1
(45) Date of Patent: Nov. 19, 2002

(54) LIGHT SOURCE

(75) Inventors: Masashi Okamoto, Akashi (JP); Takashi Asahina, Takasago (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/720,823

(22) PCT Filed: May 11, 2000

(86) PCT No.: PCT/JP00/03012

§ 371 (c)(1), (2), (4) Date: Jan. 12, 2001

(87) PCT Pub. No.: WO00/70918

PCT Pub. Date: Nov. 23, 2000

(30) Foreign Application Priority Data

May 14, 1999 (JP) .......................... 11-134010

(51) Int. Cl.[7] .............................. H05B 37/02
(52) U.S. Cl. .................. 315/219; 315/291; 331/47; 331/48
(58) Field of Search ................. 315/219, 224, 315/225, 226, 276, 291, 307, DIG. 2, DIG. 5, DIG. 7; 331/109, 182, 183, 47, 48

(56) References Cited

U.S. PATENT DOCUMENTS 5,192,897 A * 3/1993 Vossough et al. ...... 315/DIG. 5
5,363,020 A * 11/1994 Chen et al. .................. 315/219
5,453,667 A * 9/1995 Matsuda et al. ............. 315/248
5,936,358 A   8/1999 Okamoto et al. ........... 315/248

FOREIGN PATENT DOCUMENTS

EP    1 001 661 A1   5/2000
JP    8-31585        2/1996

* cited by examiner

Primary Examiner—Don Wong
Assistant Examiner—Thuy Vinh Tran
(74) Attorney, Agent, or Firm—Nixon Peabody LLP; David S. Safran

(57) ABSTRACT

A light source device for use in image readout devices capable of light emission in which a dielectric barrier discharge fluorescent lamp is synchronized with an external synchronization signal without attendant fluctuation in optical power. A phase comparator compares the oscillation signal phase of a variable frequency oscillator divided by a frequency divider with an external synchronization signal. The phase comparator controls the oscillation frequency of a variable frequency oscillator as a function of the phase difference. Consequently, the oscillation phase of the variable frequency oscillator is phase locked by the external synchronization signal. The oscillation signal of the variable frequency oscillator is input to the gate signal generation circuit, and the switch devices of an inverter circuit are opened and closed by the output of a gate signal generation circuit. The direct current voltage output by a DC power source is converted into alternating current voltage and is output by an inverter circuit and is applied to a lamp via a boosting transformer in order to light the lamp.

5 Claims, 13 Drawing Sheets

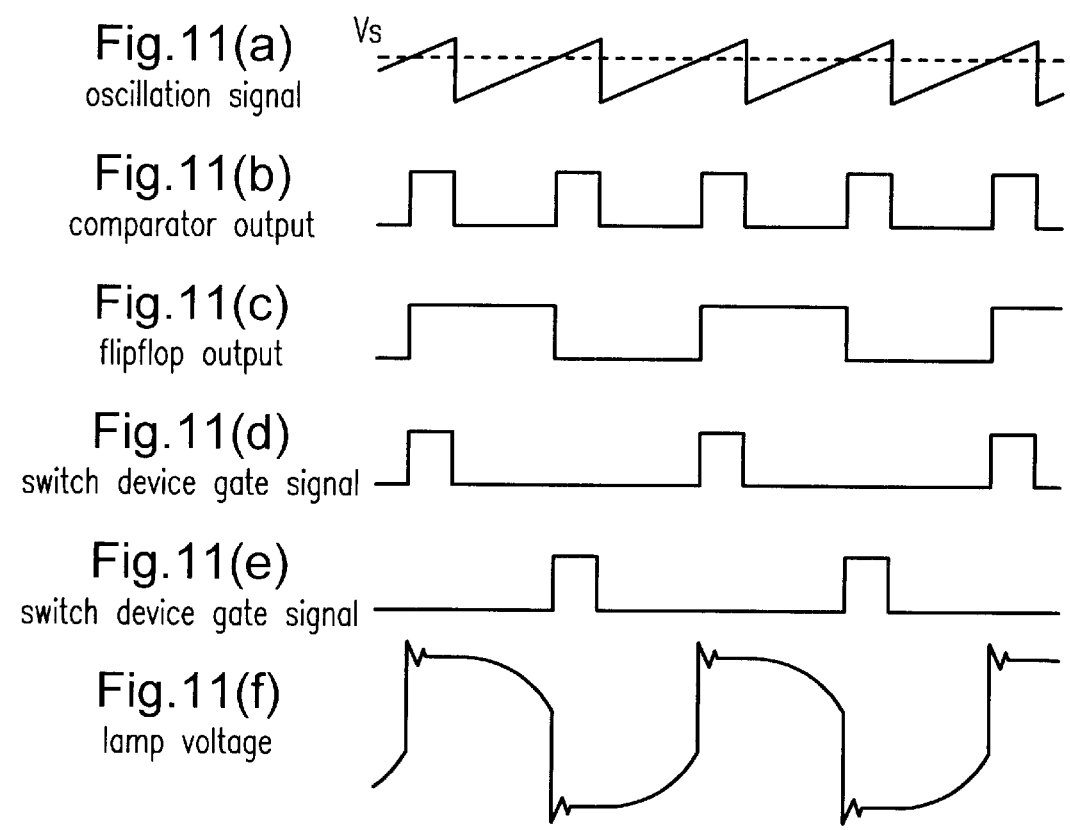

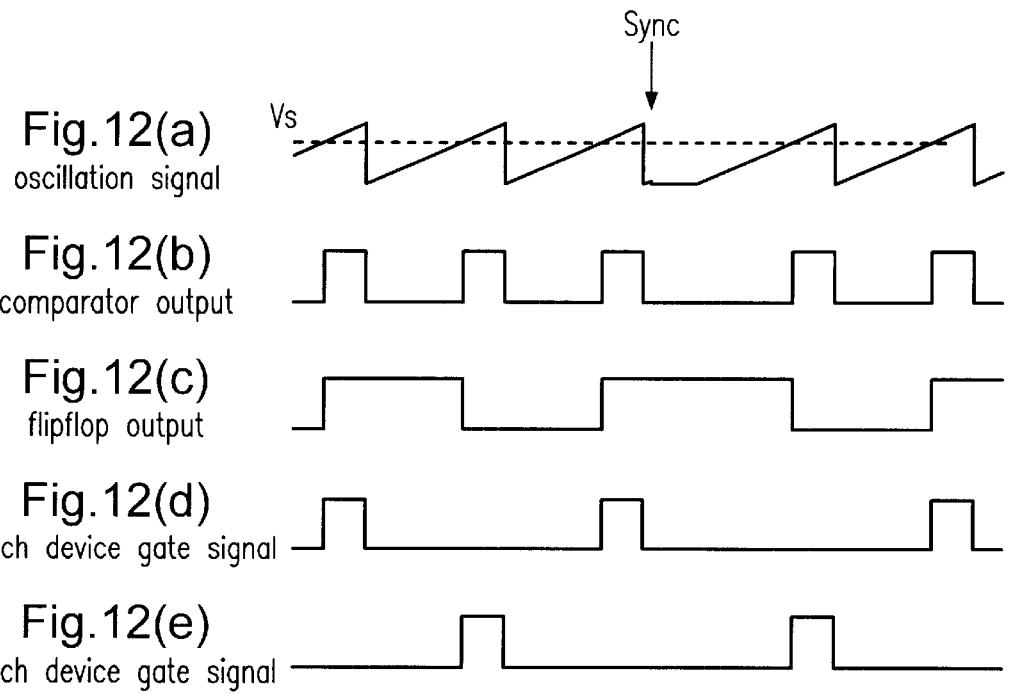
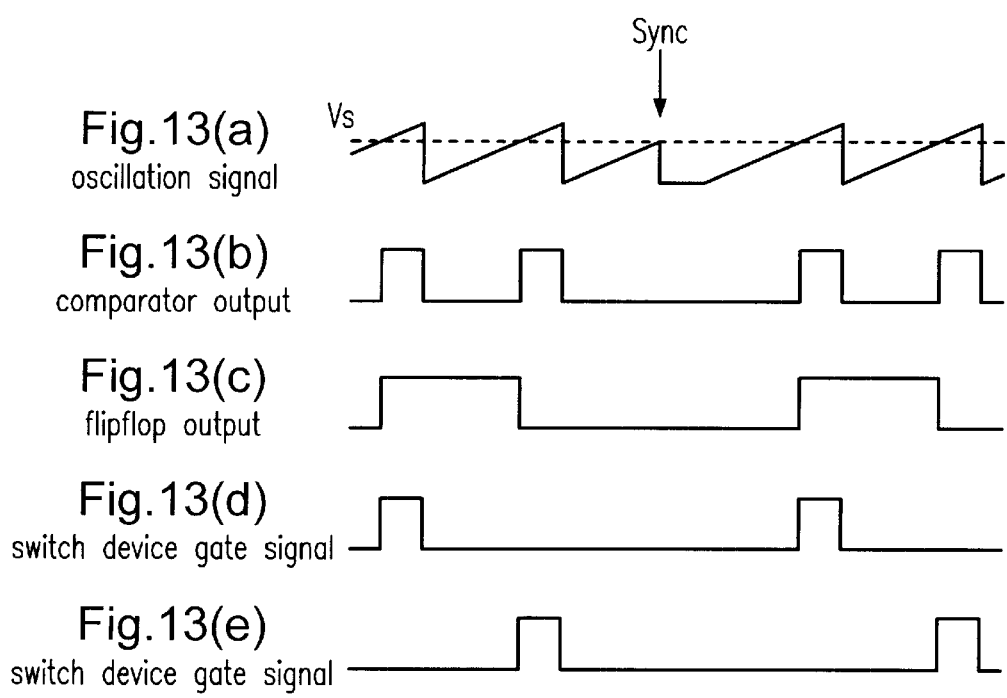

lamp voltage switch device
gate signal GU (t)

switch device
gate signal GL (t)

lamp current IG (t)

LIGHT SOURCE

BACKGROUND OF THE INVENTION

1. Field of the Invention

The present invention pertains generally to a light source device including a dielectric barrier discharge fluorescent lamp that fires utilizing ultraviolet light generated by dielectric barrier discharge. More specifically, the invention is directed to a light source device for use in image readout devices capable of light emission in which a dielectric barrier discharge fluorescent lamp is synchronized with an external synchronization signal without attendant fluctuation in optical power. A phase comparator compares the oscillation signal phase of a variable frequency oscillator divided by a frequency divider with an external synchronization signal. The phase comparator controls the oscillation frequency of a variable frequency oscillator as a function of the phase difference. Consequently, the oscillation phase of the variable frequency oscillator is phase locked by the external synchronization signal. The oscillation signal of the variable frequency oscillator is input to the gate signal generation circuit, and the switch devices of an inverter circuit are opened and closed by the output of a gate signal generation circuit. The direct current voltage output by a DC power source is converted into alternating current voltage and is output by an inverter circuit and is applied to a lamp through a boosting transformer in order to light the lamp.

2. Description of the Related Art

Light source devices including dielectric barrier discharge fluorescent lamps are conventionally used as light sources for image readout devices. FIG. 10 is a diagram showing a constituent example of the lighting circuit of a dielectric barrier discharge fluorescent lamp 1 utilizing a push-pull inverter circuit while FIG. 11 is a diagram showing the operation of the inverter circuit presented in FIG. 10. Dielectric barrier discharge fluorescent lamp 1 includes a boosting transformer 2, and an inverter circuit 3 comprising switch devices Q1, Q2 connected on the primary winding of boosting transformer 2. Alternating current voltage is applied to the primary side of boosting transformer 2 by alternately turning on switch devices Q1, Q2, and lamp 1 is lit.

The sawtooth wave shown in FIG. 11(a) is output by sawtooth wave oscillator 11 and is input to comparator Cmp which compares the sawtooth wave with the voltage Vs at a fixed level, and generates output when the sawtooth wave exceeds a fixed level signal Vs. For this reason, a pulse signal having a prescribed cycle is output as shown in FIG. 11(b) from comparator Cmp when a sawtooth wave is input. This pulse signal is input to clock terminal CLK of flipflop FF of gate signal generation circuit 4 and flipflop FF is inverted as shown in FIG. 11(c) by this pulse signal. The output Q of flipflop FF and its inverted output Q' (a horizontal line is appended over Q in the diagram, the same hereinafter) are input to the input terminals of gate circuits G1, G2, and the pulse signal output by the comparator Cmp is input to the other input terminal of aforementioned gate circuits G1, G2.

Accordingly, a 2-phase pulse signal is output from gate circuits G1, G2, as shown in FIGS. 11(d) and 11(e), and switch devices Q3, Q4 are alternately turned on by the 2-phase pulse signal. The output of switch devices Q3, Q4 is applied to the gate terminals of the switch devices Q1, Q2 via resistors R1, R2 as gate signals GU, GL for inverter circuits. In so doing, switch devices Q1, Q2 are alternately turned on, voltage is applied to lamp 1 as shown in FIG. 11(f) to light the lamp 1. Since light emission of the dielectric barrier discharge fluorescent lamp is pulse light emission rather than continuous light, the following problems arise when it is used as the light source of image readout devices.

Specifically, if the processing cycle of an image input means such as a CCD is not synchronized with the inverter oscillation of a power supply device that supplies power to a dielectric barrier discharge fluorescent lamp, the light emission pulse number participating in image readout would not be constant per processing cycle of an image input means such as a CCD, and the brightness of the image that is read per processing cycle of an image input means such as a CCD would change. The mode of this change would be periodic based on the beat of the processing cycle of an image input means such as a CCD and of inverter oscillation. Accordingly, the image that is read would contain strip-like unevenness.

When a power supply device using a flyback inverter circuit is used, synchronization of the two is easily completed by initializing oscillation of an inverter oscillator via an external synchronization signal that exhibits a specific phase (for example, initial timing of the readout cycle) in the processing cycle of an image input means such as a CCD. However, various problems arise following the initialization of an oscillator by an external synchronization signal and synchronization of the two in full-bridge, half-bridge and push-pull inverter circuits.

The lighting circuit shown in FIG. 10 is explained here. The oscillation phase of inverter oscillators and the synchronization signal Sync fluctuate is based upon various factors. If the two do not overlap, the amount of light would fluctuate based solely on the fluctuation of the light emission cycle, but if the oscillation phases of the oscillator overlap the external synchronization signal due to fluctuation of the oscillation phase, the amount of light from the lamp would change. For example, an external synchronization signal is input, as shown by the broken line in FIG. 10, when synchronizing the processing cycle of an image input means such as a CCD with lamp light emission in the lighting circuit, and oscillation of a sawtooth wave oscillator must be initialized by an external synchronization signal.

As shown in FIG. 12(a), sawtooth wave oscillator Ocs is initialized by synchronization signal Sync and oscillation commences after a prescribed period of time when the external synchronization signal Sync is input at timing (following output of a pulse signal that inverts flipflop FF from comparator Cmp). Accordingly, and as shown in FIG. 12(c), flipflop FF is inverted, and as a result, a gate signal as shown in FIGS. 12(d) and 12(e) is input to the gate terminal of switch devices Q1, Q2 of an inverter circuit and the lamp 1 is lit. In contrast, and as shown in FIG. 13(a), sawtooth wave oscillator Ocs is initialized before the sawtooth wave reaches the fixed level of voltage Vs when external synchronization signal Sync is input at the timing, and pulse signal A that inverts the flipflop FF is lost. Thus, the output of flipflop FF becomes the output, as shown in FIG. 13(c). The timing at which switch devices Q1, Q2 turn on adopts the shape shown in FIGS. 13(d) and 13(e). Consequently, the optical power of the lamp decreases.

Usually, the frequency of external synchronization signal Sync and the oscillation frequency of the sawtooth wave oscillator are adjusted since the pulse oscillation phase/frequency fluctuate due to various factors. Even if the sawtooth wave oscillator is synchronized to a certain extent by external synchronization signal Sync, the oscillation phase of the oscillator will occasionally overlap external synchronization signal Sync. The light emission of the lamp would fluctuate if the oscillation phase of the oscillator and external synchronization signal Sync alternate between overlapping and not overlapping due to fluctuation of the oscillation phase of the oscillator and of external synchronization signal Sync.

Furthermore, the ON duration of switch devices Q1 (or Q2) would contract, as shown in FIGS. 14(a)–(d), when external synchronization signal Sync and the oscillation phase of the sawtooth wave oscillator overlap, and a large surge voltage would be applied to switch devices Q1 (or Q2). This is because the dielectric barrier discharge fluorescent lamp operates as a capacitor in terms of electrical circuitry, and a large current flows only for a period when the voltage applied to the lamp changes or for a period immediately after the change. Accordingly, a large current flows immediately after switch devices Q1, Q2 turn ON, but current that increases slowly dependent on the size of the inductance on the primary side of boosting transformer 2, so-called excitation current only, flows thereafter. This current is very small compared to the pulse current that flows immediately after aforementioned switch devices turn ON.

Specifically, the lamp current would become virtually zero when switch devices Q1, Q2 turn OFF if the switch devices Q1, Q2 are ON for a duration of time exceeding that required to change the lamp that operates as a capacitor. However, when current flows through the lamp, it would be obstructed by switch devices Q1, Q2 if the ON duration of switch devices Q1, Q2 is contracted, as shown in FIG. 14. For this reason, a large surge voltage would be applied to switch devices Q1, Q2. When a circuit that controls feedback of the input voltage +V through inverter circuit 3 as well as the current flowing through lamp 1 is mounted to stabilize the optical power of the lamp, the pulse signal that inverts the flipflop FF is repeatedly lost and not lost, which brings about instability in the feedback control circuit, thereby creating great optical fluctuation. These problems arise in half-bridge and full-bridge inverter circuits as well as push-pull inverter circuits. As indicated above, problems such as fluctuation in the optical power and surge in switch devices arise when an oscillator is initialized by an external synchronization signal in push-pull, half-bridge and full-bridge inverter circuits.

SUMMARY OF THE INVENTION

Accordingly, an object of the present invention is to overcome the disadvantages of the prior art in providing a light source device that is ideal for use as the light source of image readout devices in which a dielectric barrier discharge fluorescent lamp can emit light synchronized with an external synchronization signal without attendant fluctuation in the optical power. The light source device includes a dielectric barrier discharge fluorescent lamp that emits light utilizing ultraviolet light generated by dielectric barrier discharge and an inverter oscillator of a power supply device that supplies power to said dielectric barrier discharge fluorescent lamp functions as a variable frequency oscillator. The variable frequency oscillator is controlled so that oscillation signals from said variable frequency oscillator are phase locked with an external synchronization signal.

The light source device further includes an internal phase signal in which the periodic amplitude is roughly constant is generated at a specific phase of oscillation of a variable frequency oscillator of an inverter oscillator, and oscillation of the oscillator is initialized by an external synchronization signal. The voltage of the variable frequency oscillator is controlled as a function of the length of the periods when the effective duration of the external synchronization signal and the effective duration of the internal phase signal overlap and do not overlap. Oscillation of the variable frequency oscillator is phase-locked by controlling the oscillation frequency of the frequency oscillator.

The oscillator of the inverter of the power supply device that supplies power to a dielectric barrier discharge fluorescent lamp in the present invention functions as a variable frequency oscillator, as mentioned above, and the variable frequency oscillator is controlled so that the oscillation signal from said variable frequency oscillator would be phase locked with an external synchronization signal. Accordingly, the processing cycle of an image input means such as a CCD can be synchronized with oscillation of an inverter circuit and the light emission pulse number that participates in image readout can be held constant per processing cycle of an image input means such as a CCD. In addition, fluctuation of the optical power due to overlapping of the oscillation phases of an inverter oscillator and an external synchronization signal can be prevented.

Furthermore, an internal phase signal in which the periodic amplitude is roughly constant is generated at a specific phase of oscillation of a variable frequency oscillator of an inverter, oscillation of the oscillator is initialized by an external synchronization signal, the voltage of the variable frequency oscillator is controlled as a function of the length of the periods when the effective duration of the external synchronization signal and the effective duration of aforementioned internal phase signal overlap and do not overlap, and the oscillation frequency of the frequency oscillator is controlled, thereby permitting phase locking of the oscillation phase of the inverter to the external synchronization signal without use of a frequency divider. Consequently, the device can be completed inexpensively. Furthermore, the frequency range of the external synchronization signal is not restricted as a function of the variable range of the oscillation frequency of the variable frequency oscillator.

BRIEF DESCRIPTION OF DRAWINGS

FIGS. 11(a)–(f) are diagrams showing the operation of FIG. 10;

FIGS. 12(a)–(e) are diagrams explaining the state in which the external synchronization signal and the inverter oscillation phase do not overlap;

FIGS. 13(a)–(e) are diagrams explaining the state in which the external synchronization signal and the inverter oscillation phase overlap.

DETAILED DESCRIPTION OF THE PREFERRED EMBODIMENT

Figure 1:
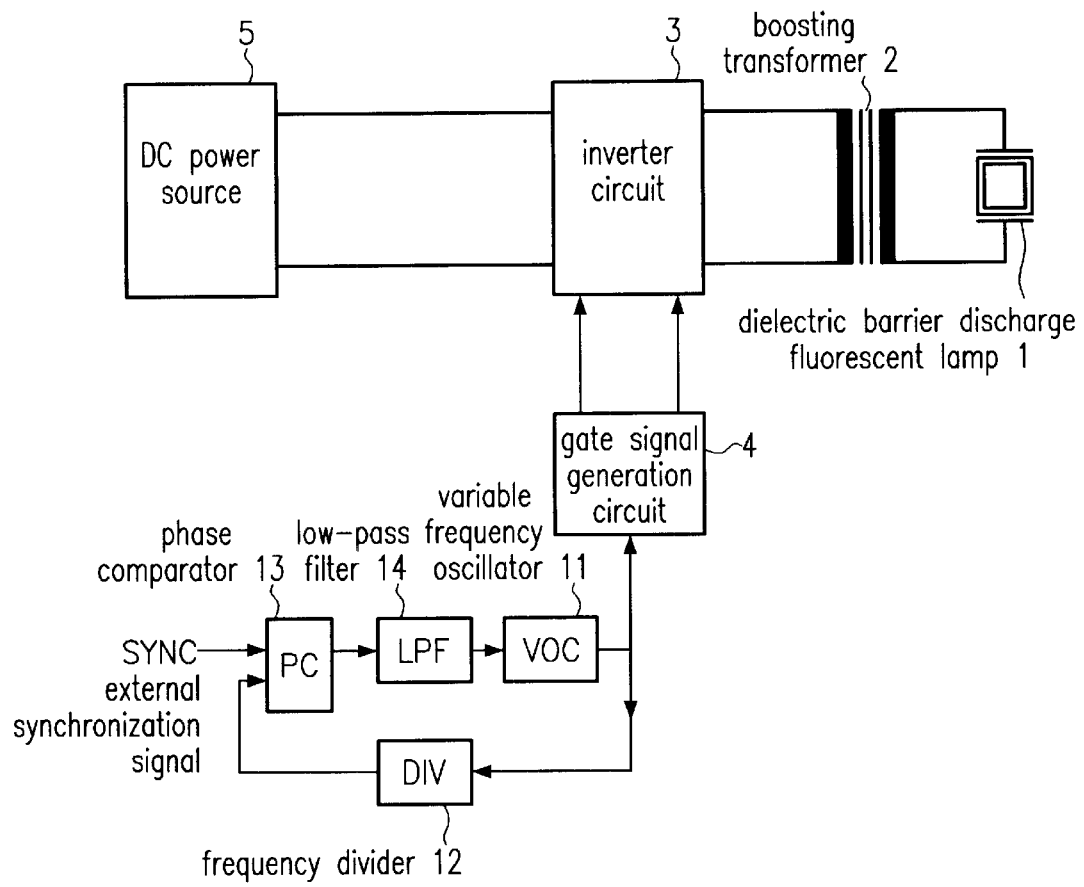
FIG. 1 is a diagram showing the overall structure of a light source device in an embodiment of the invention.

Referring now to the drawings, FIG. 1 is a diagram showing the overall structure of a light source device in a first embodiment of the present invention. A dielectric barrier fluorescent lamp 1 a DC power source 5 in which a direct current voltage output is supplied to inverter circuit 3 which switches the direct current voltage and converts it to alternating current. The alternating current voltage output by inverter circuit 3 is boosted by boosting transformer 2 and supplied to dielectric barrier discharge fluorescent lamp 1. A push-pull inverter circuit shown in FIG. 10 as well as half-bridge or full-bridge inverter circuits can be used as inverter circuit 3.

Figure 10:
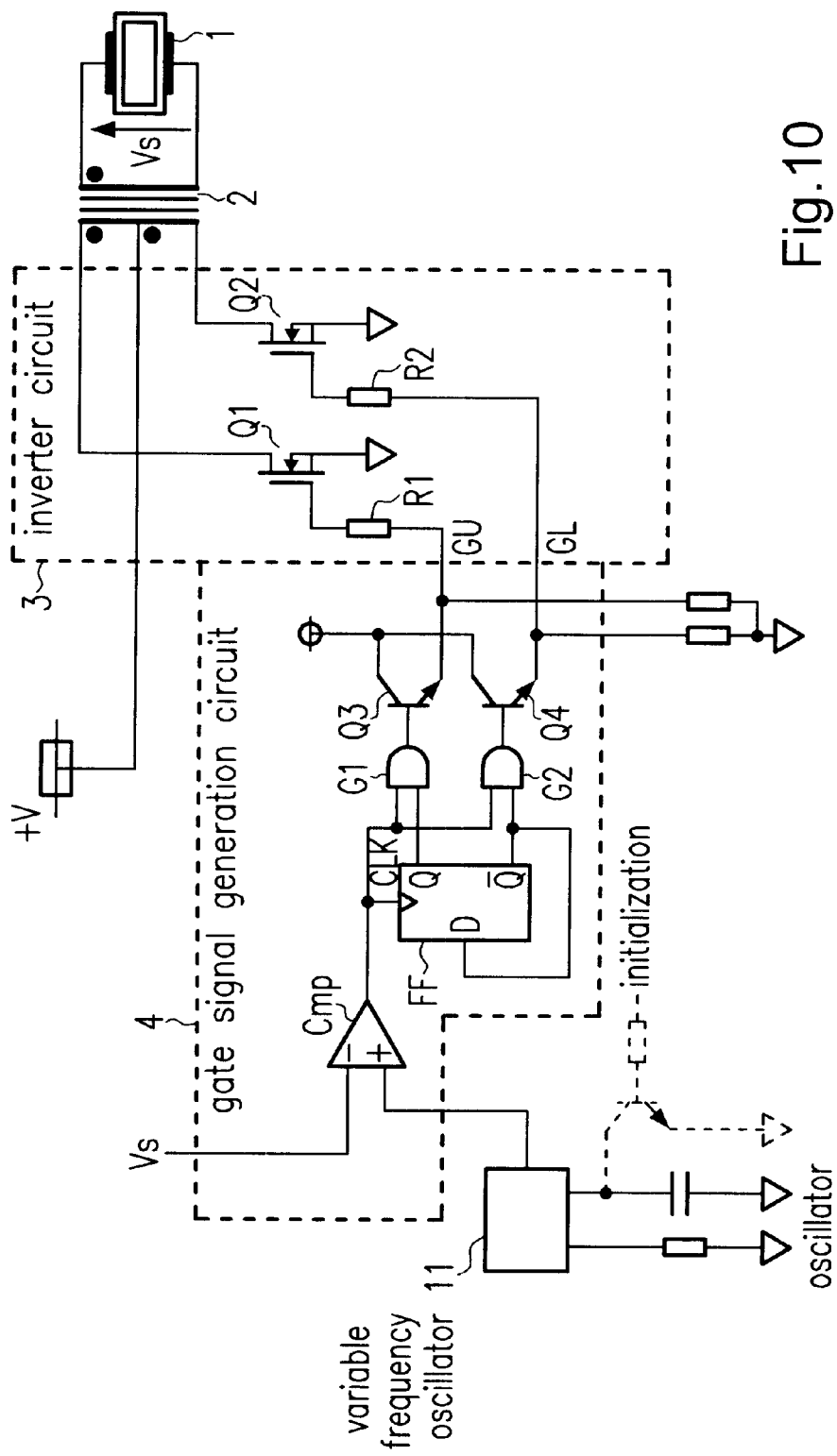
FIG. 10 is a diagram showing an example of the structure of the lighting circuit of the dielectric barrier discharge fluorescent lamp using a push-pull inverter circuit.
Figure 14A:
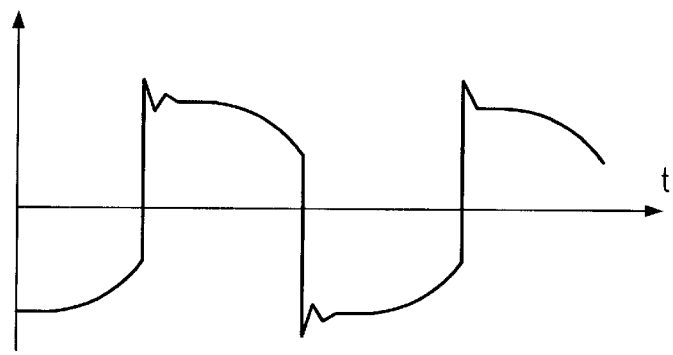
FIGS. 14(a)–(d) are diagrams showing the state in which the external synchronization signal and the inverter oscillation phase overlap when the switch device ON duration of the inverter is short.
Figure 14B:
Figure 14C:
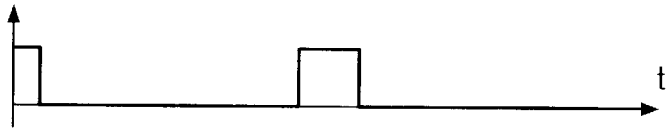
Figure 14D:
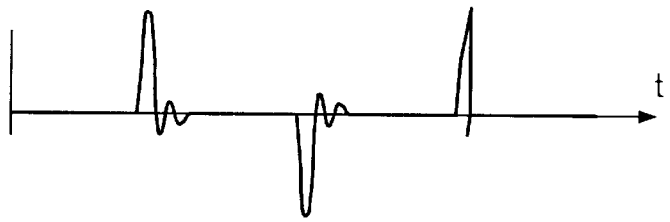

Moreover, a gate signal generation circuit 4 and a variable frequency oscillator 11 are included. A circuit provided with a same flipflop FF as shown in FIG. 10 may be used as gate signal generation circuit 4, while MC4024, an IC produced by Motorola Corp.™ may be used as variable frequency oscillator 11. The oscillation signal output from variable frequency oscillator 11 is input to gate signal generation circuit 4 to generate the gate signal that drives the switch device of inverter circuit 3. The oscillation signal output by the variable frequency oscillator 11 is divided by frequency divider 12 and is then input to phase comparator 13. Phase comparator 13 compares the output of frequency divider 12 with the phase of external synchronization signal Sync and then outputs the comparison results to low-pass filter 14 that operates as an error integrator. Low-pass filter 14 integrates the output of phase comparator 13 and generates output in response to the phase difference. MC4044, an IC produced by Motorola Corp.™ that houses these together, can be used as the phase comparator 13 and low-pass filter 14.

The output of low-pass filter 14 is input to the frequency-controlled input terminal of variable frequency oscillator 11. Variable frequency oscillator 11 oscillates at a frequency in response to the output of low-pass filter 14, with the result that the oscillation signal from variable frequency oscillator 11 is locked to the phase of external synchronization signal Sync. As a result of such a structure, variable frequency oscillator 11 oscillates at a frequency that is multiplied only by the divide ratio of frequency divider 12 to the frequency of external synchronization signal Sync, and synchronized with external synchronization signal Sync.

Figure 2:
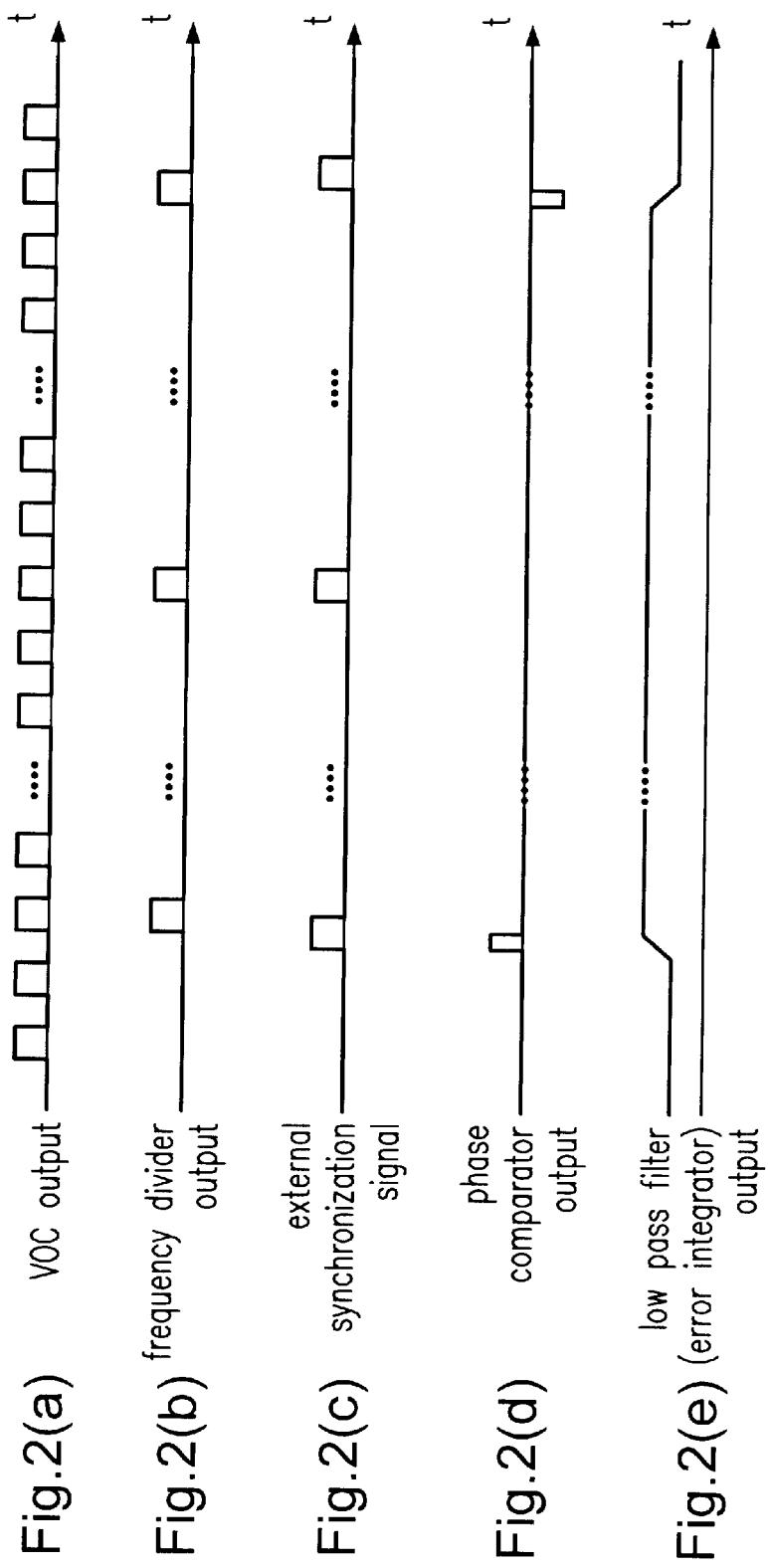
FIGS. 2(a)–(e) are diagrams showing the operation of the working example presented in FIG. 1.

FIGS. 2(a)–(e) are diagrams showing the operation of the embodiment presented in FIG. 1. Variable frequency oscillator 11 outputs the oscillation signal as shown in FIG. 2(a). This oscillation signal is divided by frequency divider 12 which then generates output as shown in FIG. 2(b). When external synchronization signal Sync is input to phase comparator 13 as shown in FIG. 2(c), phase comparator 13 compares external synchronization signal Sync (for example, its rise) with the oscillation signal (for example, its rise) of variable frequency oscillator 11 and then generates output in response to the phase difference as shown in FIG. 2(d). The output of phase comparator 13 is input to low-pass filter 14 which then integrates the output of phase comparator 13 and generates output as shown in FIG. 2(e).

The output of low-pass filter 14 is input to the frequency-controlled input terminal of variable frequency oscillator 11. Variable frequency oscillator 11 oscillates at a frequency in response to the voltage that is input to the frequency-controlled input terminal. When the oscillation signal of variable frequency oscillator 11 is retarded by external synchronization signal Sync, the output of low-pass filter 14 is raised, as shown in FIG. 2(e), and the oscillation frequency of variable frequency oscillator 11 is raised. Furthermore, when the oscillation signal of variable frequency oscillator 11 is advanced by external synchronization signal Sync, the output of low-pass filter 14 is lowered, as shown in FIG. 2(e), and the oscillation frequency of variable frequency oscillator 11 is lowered. As a result, the phase of the oscillation signal of variable frequency oscillator 11 is phase locked with the external synchronization signal. On the other hand, the oscillation signal of variable frequency oscillator 11 is input to gate signal generation circuit 5 which then outputs a gate signal that drives the switch devices of inverter circuit 3 based on aforementioned oscillation signal.

The switch devices of inverter circuit 3 open/close as a function of the gate signal and converts the direct current voltage that is output by DC power source 5 to alternating current voltage. The alternating current voltage that is output by inverter circuit 3 is applied to lamp 1 via boosting transformer 2 and then lights lamp 1. Light emission of lamp 1 can be synchronized with external synchronization signal Sync since the oscillation phase of the oscillation signal that is input to gate signal generation circuit 5 is phase locked to external synchronization signal Sync as mentioned above. Furthermore, the fluctuation of optical power shown in FIGS. 13 and 14 can be prevented since external synchronization signal Sync does not overlap the oscillation phase of the oscillator, as mentioned above.

The processing cycle of an image input means such as a CCD can be synchronized with oscillation of inverter circuit 3 since variable frequency oscillator 11 is controlled so that oscillation of variable frequency oscillator 11 is phase locked to external synchronization signal Sync in this working example. The light emission pulse number that participates in image readout becomes constant per processing cycle of an image input means such as a CCD. As a result, the brightness of the image that is read per processing cycle of an image input means such as a CCD does not change. Incidentally, installation of frequency divider 12 as in the first embodiment permits the frequency multiplication ratio to be accurately determined but it also raises the cost. In addition, the frequency range of the external synchronization signal is restricted as a function of the variable range of the oscillation frequency of variable frequency oscillator 11. A further defect is that the divide ratio of frequency divider 12 must be set as a function of the variable frequency range of the external synchronization signal.

The oscillation signal of a variable frequency oscillator is phase locked to the external synchronization signal without using a frequency divider in a second embodiment of the present invention. An internal phase signal in which the periodic amplitude is roughly constant is generated at a specific phase of oscillation of a variable frequency oscillator of an inverter, and oscillation of the oscillator is initialized by an external synchronization signal. Out of the effective durations of the external synchronization signal, the duration of overlap with the effective duration of the internal phase signal raises the frequency of the variable frequency oscillator while the duration of no overlap with the effective duration of the internal phase signal out of the effective durations of the external synchronization signal lowers the frequency of the variable frequency oscillator, resulting in phase lock of oscillation of the variable frequency oscillator to the external synchronization signal.

Figure 3:
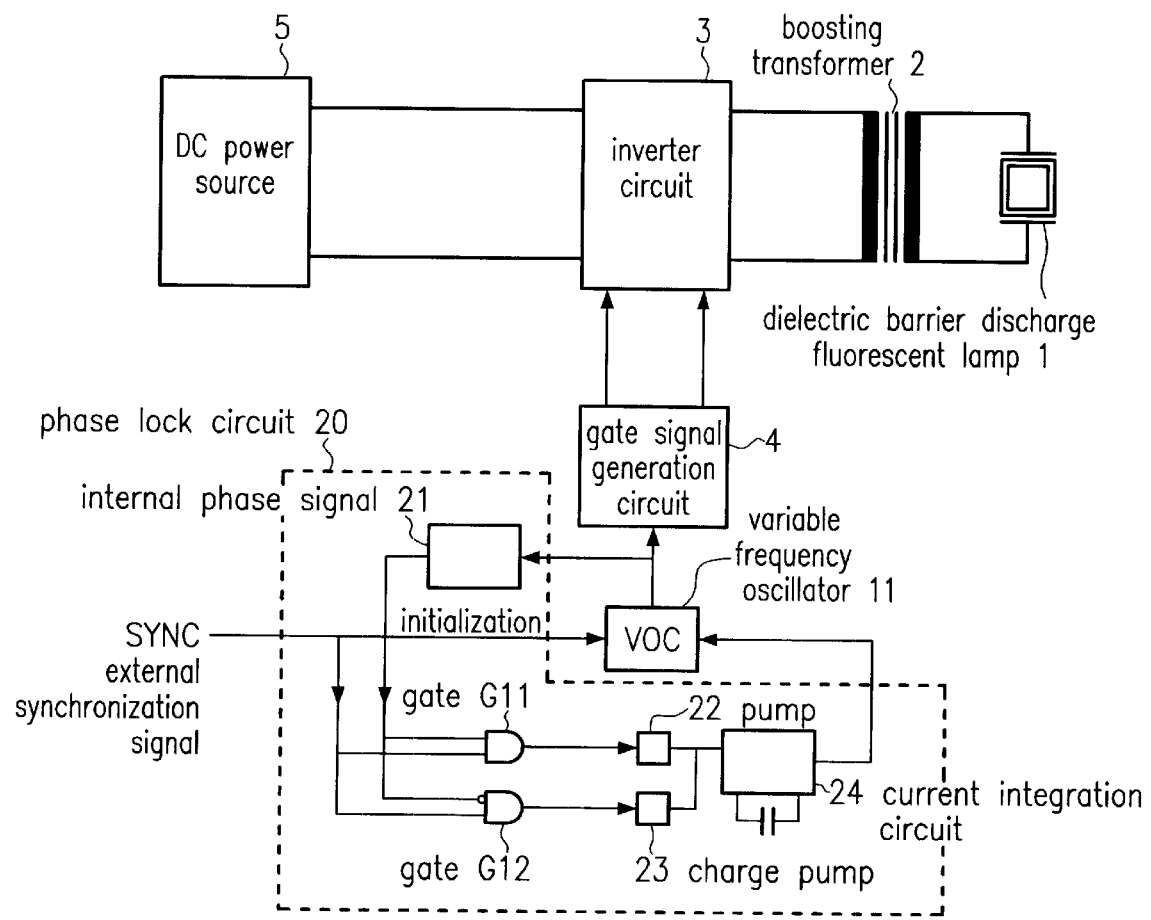
FIG. 3 is a diagram showing a second embodiment of the present invention.

FIG. 3 is a diagram showing a second embodiment of the present invention. The sections that are identical with those in FIG. 1 are given the same notation. A variable frequency oscillator 11 is initialized by external synchronization signal Sync. The oscillation signal that is output by variable frequency oscillator 11 is provided to gate signal generation circuit 4 and is input to pulse generator 21 that generates an internal phase signal in which the periodic amplitude is roughly constant at a specific phase of said oscillation signal. The output of pulse generator 21 is input to one input terminal of gate circuits G11, G12, while external synchronization signal Sync is input to the other input terminal of gate circuits G11, G12. Both input terminals of gate circuit G11 generate output at high level, while gate circuit G12 generates output when the output of pulse generator 21 is at a low level and external synchronization signal Sync is at a high level. The outputs of gate circuits G11, G12 are input to current integration circuit 24 via charge pump 22 and discharge pump 23. Current integration circuit 24 generates voltage in response to the phase difference of external synchronization signal Sync and the output of the pulse generator 21. This voltage is input to the frequency controlled terminal of variable frequency oscillator 11. The circuit including the pulse generator 21, gate circuits G11, G12, charge pump 22, discharge pump 23, and current integration circuit 24 is termed phase lock circuit 20.

The oscillation signal of variable frequency oscillator 11 is input to gate signal generation circuit 4, as mentioned above, and gate signal generation circuit 4 outputs a gate signal that drives the switch devices of inverter circuit 3 based upon the oscillation signal. The switch devices of inverter circuit 3 open/close as a function of the gate signal and the direct current voltage that is output by DC power source 5 is converted to alternating current voltage. The alternating current voltage that is output by inverter circuit 3 is applied to lamp 1 via boosting transformer 2, thereby lighting the lamp. On the other hand, the oscillation signal of variable frequency oscillator 11 is input to pulse generator 21 which then generates an internal phase signal in which the periodic amplitude is roughly constant at a specific phase of said oscillation signal.

Gate circuit G11 generates output when the internal phase signal is at a high level and the external synchronization signal is at a high level. It operates charge pump 22 for current integration circuit 24 and raises the output. In addition, gate circuit G12 generates output when the internal phase signal is at a low level and the external synchronization signal is at a high level. It operates discharge pump 23 for current integration circuit 24 and reduces the output. Consequently, the output voltage of current integration circuit 24 is unchanged when the period during which the internal phase signal is at a high level and the external synchronization signal is at a high level is equal to the period during which the internal phase signal is at a low level and the external synchronization signal is at a high level.

On the other hand, when the internal phase signal reaches a phase that is more advanced than the external synchronization signal, the durations of low level internal phase signal and high level external synchronization signal become longer, and the output voltage of current integration circuit 24 falls. Accordingly, the oscillation frequency of variable frequency oscillator 11 falls. Accordingly, the duration of high level internal phase signal and high level external synchronization signal becomes equal to the duration of low level internal phase signal and high level external synchronization signal. Conversely, when the internal phase signal reaches a phase that is more retarded than the external synchronization signal, the durations of low level internal phase signal and high level external synchronization signal become shorter and the output voltage of current integration circuit 24 rises. For this reason, the oscillation frequency of variable frequency oscillator 11 rises and the duration of high level internal phase signal and high level external synchronization signal becomes equal to the duration of low level internal phase signal and high level external synchronization signal.

As indicated above, the oscillation frequency of variable frequency oscillator 11 is controlled as a function of the phase difference between external synchronization signal Sync and the internal phase signal, and the oscillation signal of variable frequency oscillator 6 becomes phase locked with the external synchronization signal. Fluctuation of the optical power can be prevented with no overlapping of external synchronization signal Sync with the oscillation phase of the oscillator, as in the first embodiment, since variable frequency oscillator 11 is controlled so as to phase lock variable frequency oscillator 11 to external synchronization signal Sync in this working example, as indicated above. Furthermore, the processing cycle of an image input means such as a CCD is synchronized with the inverter of a power supply device so that the light emission pulse number that participates in image readout becomes constant per processing cycle of an image input means such as a CCD. Accordingly, the brightness of images that are read per processing cycle of an image input means such as a CCD does not change.

Furthermore, a more inexpensive structure can be completed since the oscillation signal of variable frequency oscillator 11 can be phase locked to the external synchronization signal without using a frequency divider. In addition, the frequency range of the external synchronization signal is not restricted as a function of the variable range of the oscillation frequency of variable frequency oscillator 11.

Figure 4:
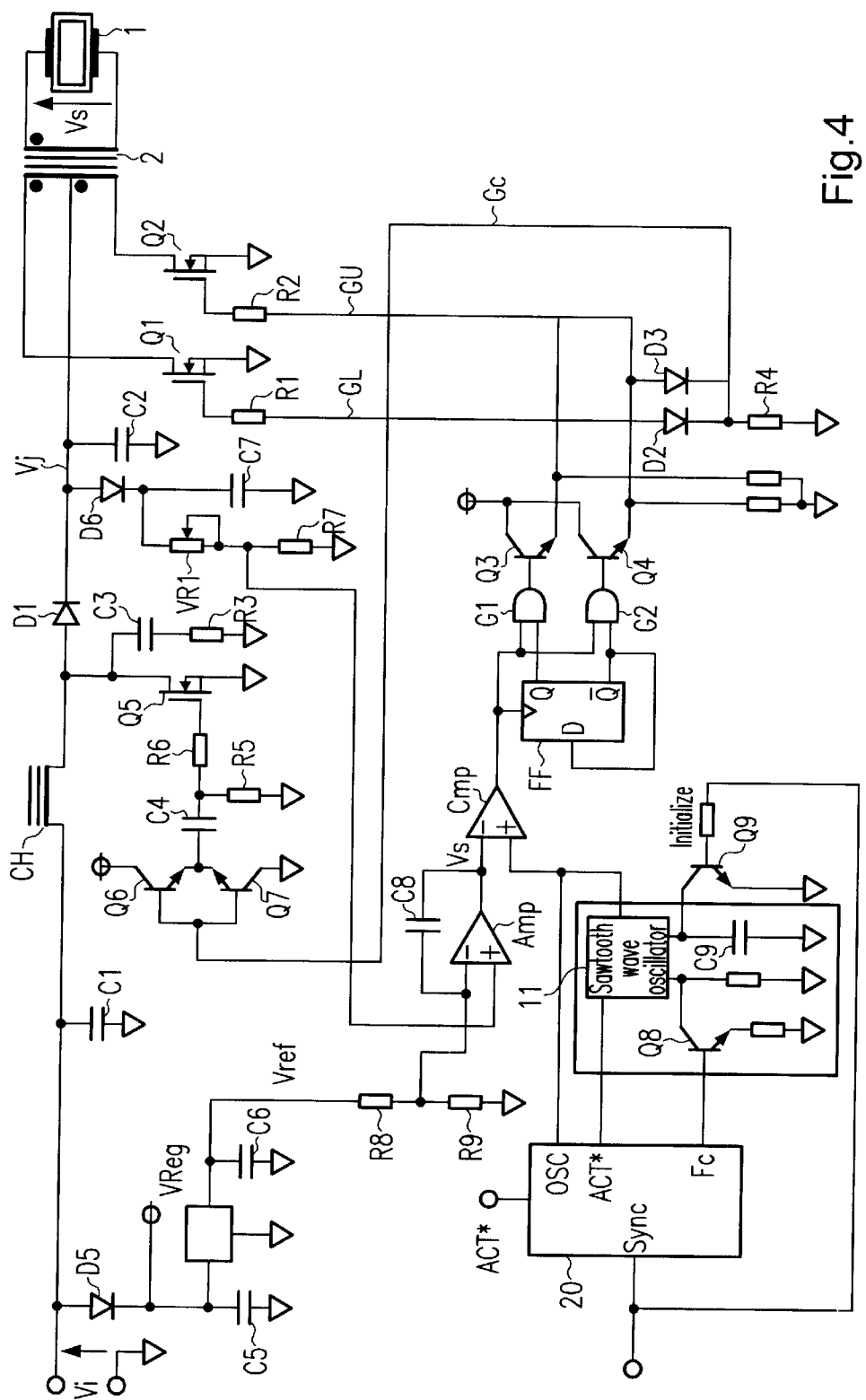
FIG. 4 is a diagram showing the detailed structure of the second embodiment of the present invention.
Figure 5:
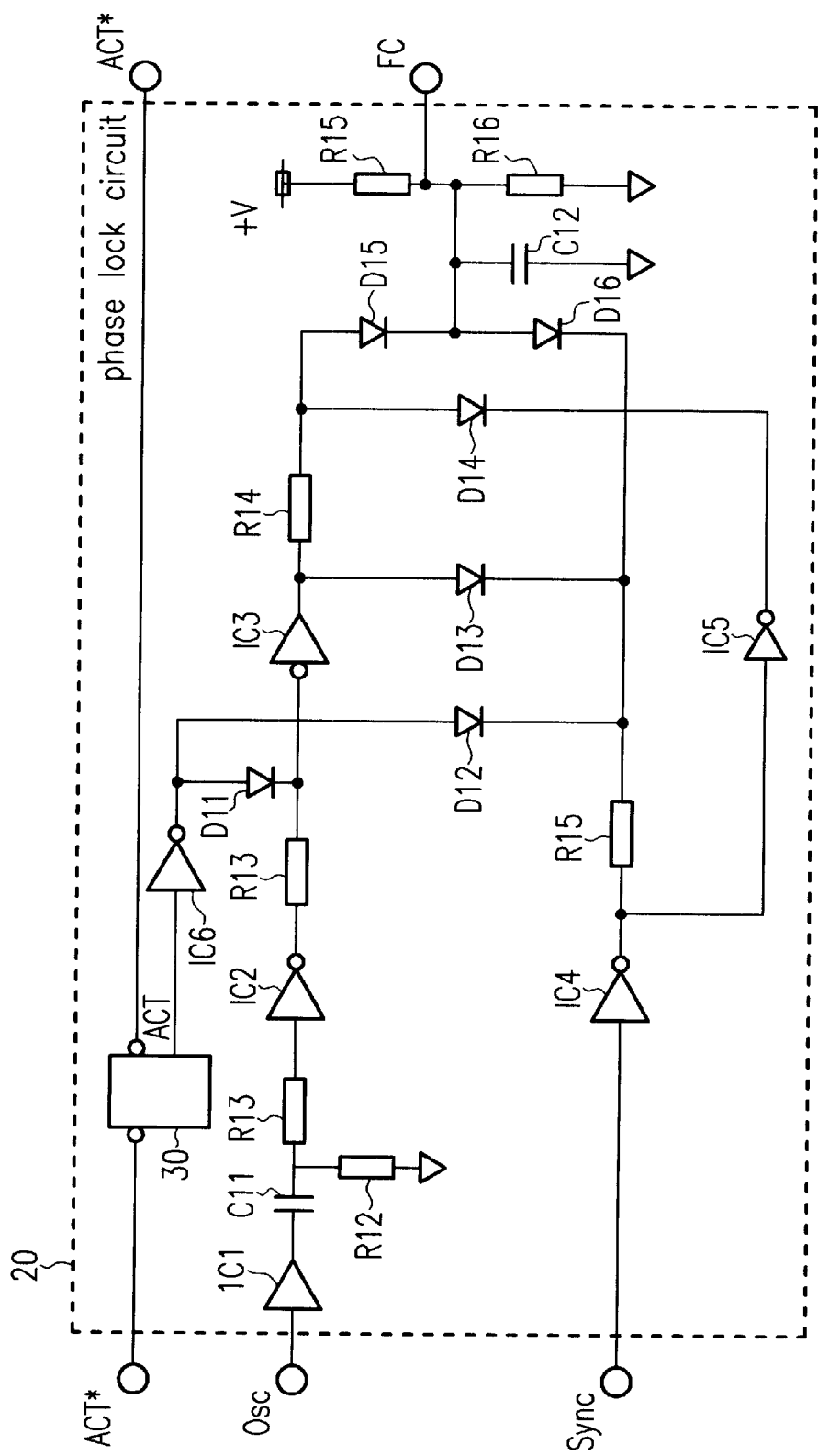
FIG. 5 is a diagram showing the structure of the phase lock circuit in FIG. 4.

FIG. 4 is a diagram showing the overall structure of a light source device while FIG. 5 shows the circuit structure of phase lock circuit 20 in FIG. 4. The basic structures of inverter circuit 3 and gate signal generation circuit 4 in this working example are identical with those shown in FIG. 10. A push-pull inverter circuit was explained in FIG. 4, but a full-bridge or half-bridge circuit as mentioned above may be used as inverter circuit 3. In FIG. 4, chopper circuit, gate generation circuit and inverter circuit are shown whereby DC voltage Vi supplied from a DC voltage source (not shown) which is connected to switch device Q5 utilizing FET, etc., via capacitor C1 and choke coil CH. When switch device Q5 changes from ON to OFF, the induction voltage generates at choke coil CH is accumulated in smoothing capacitor C2 via diode D1 as boosted DC voltage Vj. The chopper circuit including the choke coil CH, switch device Q5, diode D1 and smoothing capacitor C2 is generally termed a boosting chopper circuit. A snubber circuit for surge absorption including capacitor C3 and resistor R3, etc., is optionally mounted in switch device Q5 for a chopper circuit.

The push-pull inverter circuit shown in FIG. 10 includes switch devices Q1, Q2 utilizing FET, etc., as well as boosting transformer 2. The output voltage Vj of the chopper circuit is connected to the central tab on the primary side of boosting transformer 2. Voltage is applied to lamp 1 as shown in FIG. 11(f) and lamp 1 is lit when switch devices Q1, Q2 alternately turn ON. The output of sawtooth wave oscillator 11 that generates sawtooth waves having frequency in response to the voltage applied to the frequency controlled terminal is input to one input terminal of comparator Cmp. Output voltage Vs from operational amplifier Amp is input to the other input terminal of comparator Cmp. A square-wave oscillation signal in which the duty cycle ratio shown in FIG. 11(b) is modulated as a function of the high-low relation between the output sawtooth wave of variable frequency oscillator 11 and the output voltage Vs from the operational amplifier Amp is output from comparator Cmp.

The oscillation signal output from comparator Cmp is input to gate signal generation circuit 4 comprising flipflop FF, gate circuits G1, G2, switch devices Q3, Q4. Gate signals GU, GL for the inverter circuit are generated as a result. Gate signals GU, GL for the inverter circuit are input to the gate terminals of switch devices Q1, Q2 via respective resistors R1, R2. On the other hand, the chopper gate signal generation circuit is constructed using a signal adder comprising diodes D2, D3 and resistors R4. Gate signal Gc for the chopper circuit is generated by input of gate signals GU, GL for the inverter circuit thereto. The method of generating signals synchronized with gate signals GU, GL for the inverter circuit is one of the simplest methods of generating gate signal Gc for a chopper circuit via the signal adder. Gate signal Gc for a chopper circuit is input to the gate terminal of switch device Q5 for aforementioned chopper circuit via buffer circuit comprising total transistors Q6, Q7, differentiation circuit comprising capacitor C4 and resistor R5, and resistor R6. The buffer circuit includes total transistors Q6, Q7, differentiation circuit including capacitor C4 and resistor R5 are added to reduce the possibility of loss which readily arises when switch device Q5 for the chopper circuit turns ON. They may be optionally omitted.

The operation of the switch devices Q1, Q2 for an inverter circuit, comparator Cmp and gate signal generation circuit 4 is identical with that shown in FIGS. 11(a)–(f). The operation of an inverter in this embodiment and the operation of the chopper circuit are explained in the following. Gate signal Gc for a chopper circuit reaches high level when either gate signal GU, GL for the inverter circuit in FIG. 4 reaches the high level. Consequently, the frequency of gate signal Gc for the chopper circuit reaches the frequency for circuit operation, specifically, double the frequency of the switch devices Q1, Q2 for the inverter circuit. Switch device Q5 for the chopper circuit turns ON when gate circuit Gc for the chopper circuit reaches a high level. The current through the choke coil CH increases and magnetic energy accumulates in choke coil CH. When gate signal Gc of the chopper circuit reaches the low level, switch device Q5 for the chopper circuit turns OFF and current through the choke coil CH decreases. Magnetic energy accumulated in choke coil CH charges the smoothing capacitor C2 as electrical energy. On the other hand, when one of two gate signals GU, GL for the inverter circuit reaches the high level, one of the corresponding switch devices Q1, Q2 turns ON and the voltage waveform imposed on the lamp steeply changes in the direction of polarity reversal at the secondary side of boosting transformer 2. Discharge is then generated at lamp 1.

As mentioned above, current flows in pulses to switch devices Q1 or Q2 and to lamp 1 immediately after one of the two switch devices Q1, Q2 turns ON since lamp 1 functions overall as a capacitor, but after the end of discharge, there is no significant current flow to the lamp. Accordingly, even if one of two switch devices Q1, Q2 for the inverter circuit turns ON after discharge ends, only current that increases slowly dependent on the size of inductance on the primary side of boosting transformer 2, so-called excitation current, would flow to switch devices Q1, Q2. This is quite small compared to the pulse current that flows immediately after the switch devices for aforementioned inverter circuit turns ON. In short, the voltage output from aforementioned chopper circuit is virtually constant since the charge flowing out from the smoothing capacitor C2 is slight after the end of pulse current that flows immediately after switch devices Q1, Q2 turn ON.

A feedback stabilization control function of the lamp feed power that is included in the circuit shown in FIG. 4. The power source for gate signal generation circuits, etc., or controlling circuits for feedback stabilization control, etc., decreases as a result of the steep power-source peak current that accompanies operation of the chopper circuit due to diode D5 and capacitor C5, and it is supplied to reference voltage source VReg. Capacitor C6 is connected on the output side of reference voltage source VReg which then generates reference voltage VRef for feedback stabilization control. On the other hand, chopper circuit output voltage Vj is detected as the object of feedback stabilization control by diode D6, capacitor C7, variable resistor VR1, resistor R7. Diode D6, capacitor C7 comprise the pick-hold circuit which removes ripples in chopper circuit output voltage Vj.

The detected chopper circuit output voltage is input to the non-inverted input terminal of the operational amplifier Amp. On the other hand, the output voltage of reference voltage source VS is divided by resistors R8, R9, and is input to the inverted input terminal of the operational amplifier Amp. Feedback capacitor C8 is connected between the output terminal and the inverted input terminal to operate as an error integration circuit in operational amplifier Amp. In this embodiment, a circuit structure is provided to control feedback stabilization of the structure. The output voltage of operational amplifier Amp is raised when the input voltage to the noninverted input terminal of aforementioned operational amplifier Amp is higher than the input voltage to the inverted input terminal. For this reason, the duty ratio of the oscillation signal from the comparator Cmp falls. Specifically, the duration of two low level gate signals increases while the duty ratio of the duration when switch device Q5 for the chopper circuit is ON declines. As a result, chopper circuit output voltage Vj declines. Conversely, chopper circuit output voltage Vj is raised when the input voltage to the noninverted input terminal of the operational amplifier Amp is lower than the input voltage to the inverted input terminal.

Specifically, chopper circuit output voltage Vj is controlled at a constant, with the result that the lamp input voltage is subjected to constant feedback stabilization control. Furthermore, the lamp input voltage can be altered by adjusting the variable resistor VR1. The oscillation signal duty ratio fluctuates accompanying the feedback operation, with the result that the duty ratio of switch devices Q1, Q2 for the inverter circuit fluctuates. However, current flows in pulses immediately after one of switch devices Q1, Q2 turns ON since lamp 1 basically operates as a capacitor, as mentioned above, but after discharge is completed, there is no significant flow of current to the lamp. For this reason, fluctuation in aforementioned duty cycle poses no problems with discharge of the lamp itself or with power applied to the lamp.

Among the circuit devices used to construct the light source device in the embodiment shown in FIG. 4, integrated circuit IC7 that houses the sawtooth wave oscillation circuit 11, voltage comparator Cmp, operational amplifier Amp, flipflop FF, gate circuits G11, G12, transistors Q3, Q4, reference voltage source Vs, etc., in a single package has been marketed (for example, TL 494 from Texas Instruments™) so that the circuit can be manufactured with far fewer components.

The oscillation frequency of the sawtooth wave oscillator 11 is controlled by the voltage that is input to the frequency control terminal, and the oscillation phase is controlled so as to be synchronized with external synchronization signal Sync. Accordingly, phase lock circuit 20 is mounted in the embodiment shown in FIG. 4, transistor Q8 is connected to the frequency controlled terminal of sawtooth wave oscillator 11 and frequency controlled signal FC that is output by phase lock circuit 20 is input to the transistor Q8. The oscillation frequency of sawtooth wave oscillator 11 is controlled as a function of the magnitude of the frequency controlled signal FC. In addition, external capacitor 9 is attached in sawtooth wave oscillator 11 to establish the oscillation frequency. The oscillation of sawtooth wave oscillator 11 is initialized by discharge of capacitor C9.

FIG. 5 is a diagram showing the structure of the phase lock circuit 20. Initialization signal Sync is input to the synchronization signal input terminal Sync, and is input to switch device Q9 shown in FIG. 4. In addition, the oscillation signal of sawtooth wave oscillator 11 is input to the input terminal Osc of phase lock circuit 20. Phase lock circuit 20 has the same function as that of the phase lock circuit shown in FIG. 3, and is provided with a circuit corresponding to pulse generator 21 having a phase lock circuit in FIG. 3 (circuit comprising IC1, capacitor C11, IC2, etc.), a circuit corresponding to gate circuits G11, G12 (logic circuit comprising diodes D13, D14), a circuit corresponding to charge pump 22, discharge pump 23 (circuit comprising diodes D15, D16), and a circuit corresponding to current integration circuit 24 (circuit comprising capacitor C12, etc.). The oscillation phase of sawtooth wave oscillator 11 locked by initialization signal Sync through the same operations as those explained in FIG. 3. Furthermore, phase lock circuit 20 is provided with start/stop circuit 30 that discontinues operation once start signal ACT reaches a low level.

Figure 6:
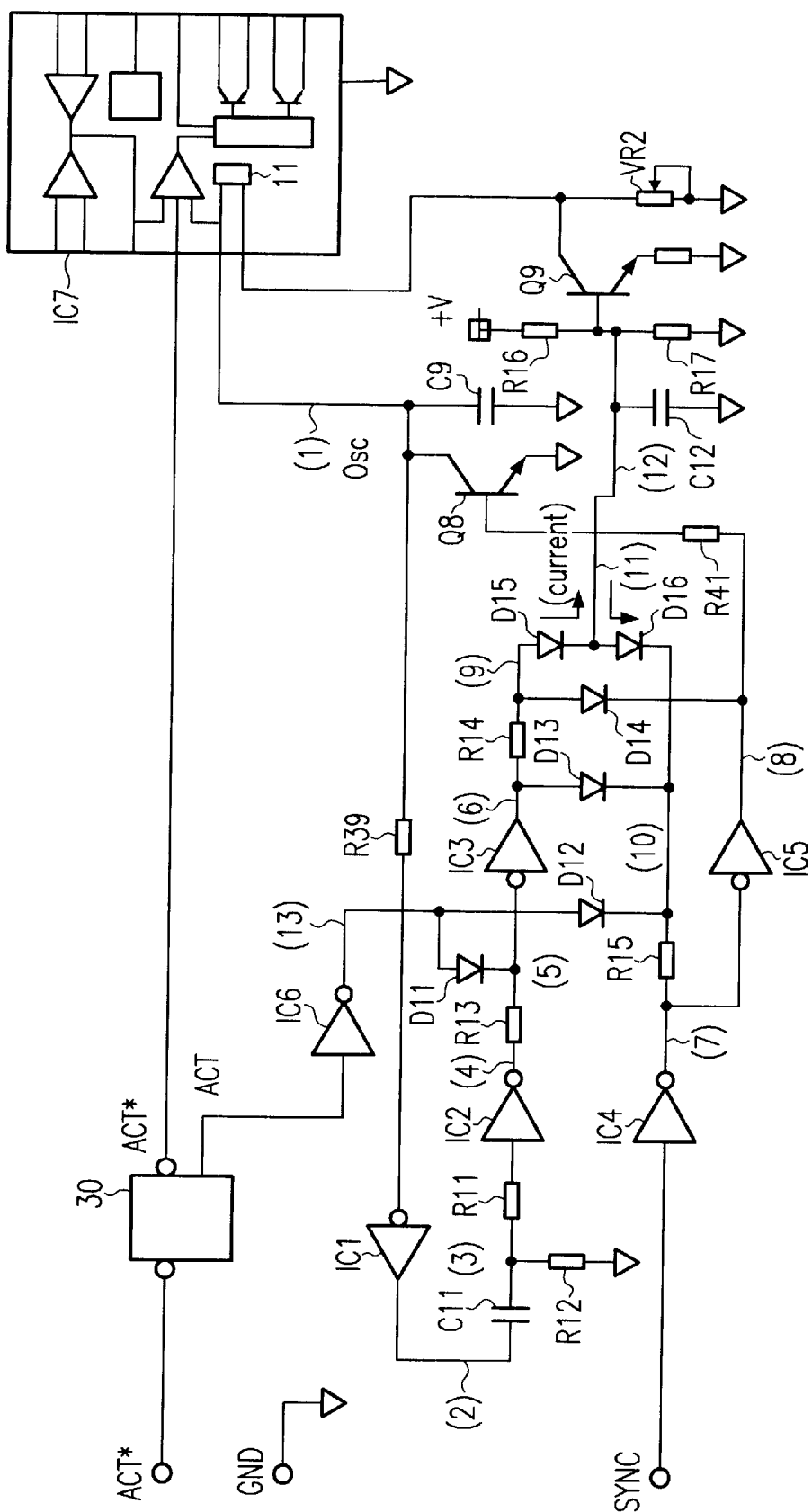
FIG. 6 is a diagram showing the sawtooth wave oscillator with the phase lock circuit of FIG. 4.

FIG. 6 shows a circuit comprising phase lock circuit 20 shown in FIGS. 4 and 5 and sawtooth wave oscillator 11 that is integrated in one board. The sections that are identical with those in FIGS. 4 and 5 are given the same notation, including a sawtooth wave oscillator 11 IC7 and a start/stop circuit 30. When the start signal ACT* is at a high level (shutdown state), the output ACT of start/stop circuit 30 is at a low level and the output of logic inversion circuit IC6 is at a high level. As a result, the output side of resistors R13, R15 is clamped at a high level via diodes D11, D12, and the circuit control operation is shut down. On the other hand, when the start signal ACT* is at a low level, the output ACT of start/stop circuit 30 is at a high level and the output of logic inversion circuit IC6 is at a low level. As a result, circuit operations can continue.

Circuit operation is explained with the start signal ACT* at a low level and continuation of circuit operations permitted is explained in the following. The oscillation signal from sawtooth wave oscillator 11 is input to logic inversion circuit IC1. Logic inversion circuit IC1 generates low level output that exceeds the fixed level of amplitude of the sawtooth wave oscillation signal. The pulse signal output by logic inversion circuit IC1 is differentiated by a differentiation circuit comprising capacitor C11 and resistor R12 and is input to logic inversion circuit IC2 via resistor R11. Logic inversion circuit IC2 generates low level output when the differentiation waveform output by the differentiation circuit exceeds a fixed level. Specifically, logic inversion circuit IC2 outputs a pulse signal in which the pulse amplitude is roughly fixed and in which the frequency is equal to the oscillation frequency of aforementioned sawtooth wave oscillator 11.

This pulse signal is then inverted by logic inversion circuit IC3. The circuit including the logic inversion circuit IC1, differentiation circuit. Logic inversion circuit IC3 corresponds to pulse generator 21 shown in FIG. 3. The pulse signal output by logic inversion circuit IC3 is termed the internal phase signal. Resistor R14 and diode D13 are connected to the output side of logic inversion circuit IC3 while resistor R15 is connected to the cathode side of diode D13. Furthermore, diode D14 is connected to the output side of resistor R14 while the cathode side of diode D14 is connected to the output side of logic inversion circuit IC5. External synchronization signal Sync is input to the input of logic inversion circuit IC4 and is a positive logic pulse of 0.5 to 4 µs amplitude. The output of logic inversion circuit IC4 is high level when external synchronization signal Sync is not input (at low level) and the output of logic inversion circuit IC5 connected to the output side of logic inversion circuit IC4 is low level.

Furthermore, the output of logic inversion circuit IC4 is low level when external synchronization signal Sync is input (at high level), and the output of logic inversion circuit IC5 is high level. The output of logic inversion circuit IC4 is connected to the cathode side of diode D13 via resistor R15. Furthermore, the output of logic inversion circuit IC5 is connected to the controlled input terminal of transistor Q8. Transistor Q8 turns ON when external synchronization signal Sync is high level, and capacitor C9 discharges. Sawtooth wave oscillator 11 is initialized as a result. The output of logic inversion circuit IC4 is high level when external synchronization signal Sync is not input (at low level), the output of logic inversion circuit IC5 is low level and the output side of the logic inversion circuit IC3 is clamped at low level. As a result, the internal phase signal that is output by logic inversion circuit IC3 is not input to diode D15.

Conversely, the output of logic inversion circuit IC4 is low level when external synchronization signal Sync is input (at high level), and the output of logic inversion circuit IC5 is high level. Here, current flows to diode D15 via resistor R14 from logic inversion circuit IC3 when the internal phase signal (output of logic inversion circuit IC3) is high level. Furthermore, the potential on the cathode side of diode D16 reaches high level via diode D13 because the output of logic inversion circuit IC3 is high level. As a result, capacitor C12 that is connected at the contact points of diodes D15, D16 is charged. The output side of logic inversion circuit IC3 does not reach low level since resistor R15 is connected to the output side of logic inversion circuit IC4 even though the output side of logic inversion circuit IC4 at this time is low level. Furthermore, internal phase signal reaches low level (output of logic inversion circuit IC3 is low level) when external synchronization signal Sync is high level (output of logic inversion circuit IC4 is low level), and the potential on the anode side of diode D15 becomes low level. Current then flows to logic inversion circuit IC4 via diode D16, resistor R15. As a result, capacitor C12 that is connected at the contact points of diodes D15, D16 is discharged.

Specifically, the circuit comprising aforementioned logic inversion circuits IC3, IC4, IC5, diodes D13, D14, D15, D16, etc., functions as gates G11, G12, charge pump 22, discharge pump 23 as shown in FIG. 3, and capacitor C12 functions as current integration circuit 24. The voltage of capacitor C12 is input to transistor Q9 and the oscillation frequency of sawtooth wave oscillator 11 is controlled by the output voltage of transistor Q9. In addition, variable resistor VR2 is connected in parallel to transistor Q9, and the oscillation frequency of sawtooth wave oscillator 11 can be adjusted by variable resistor VR2.

Figure 7:
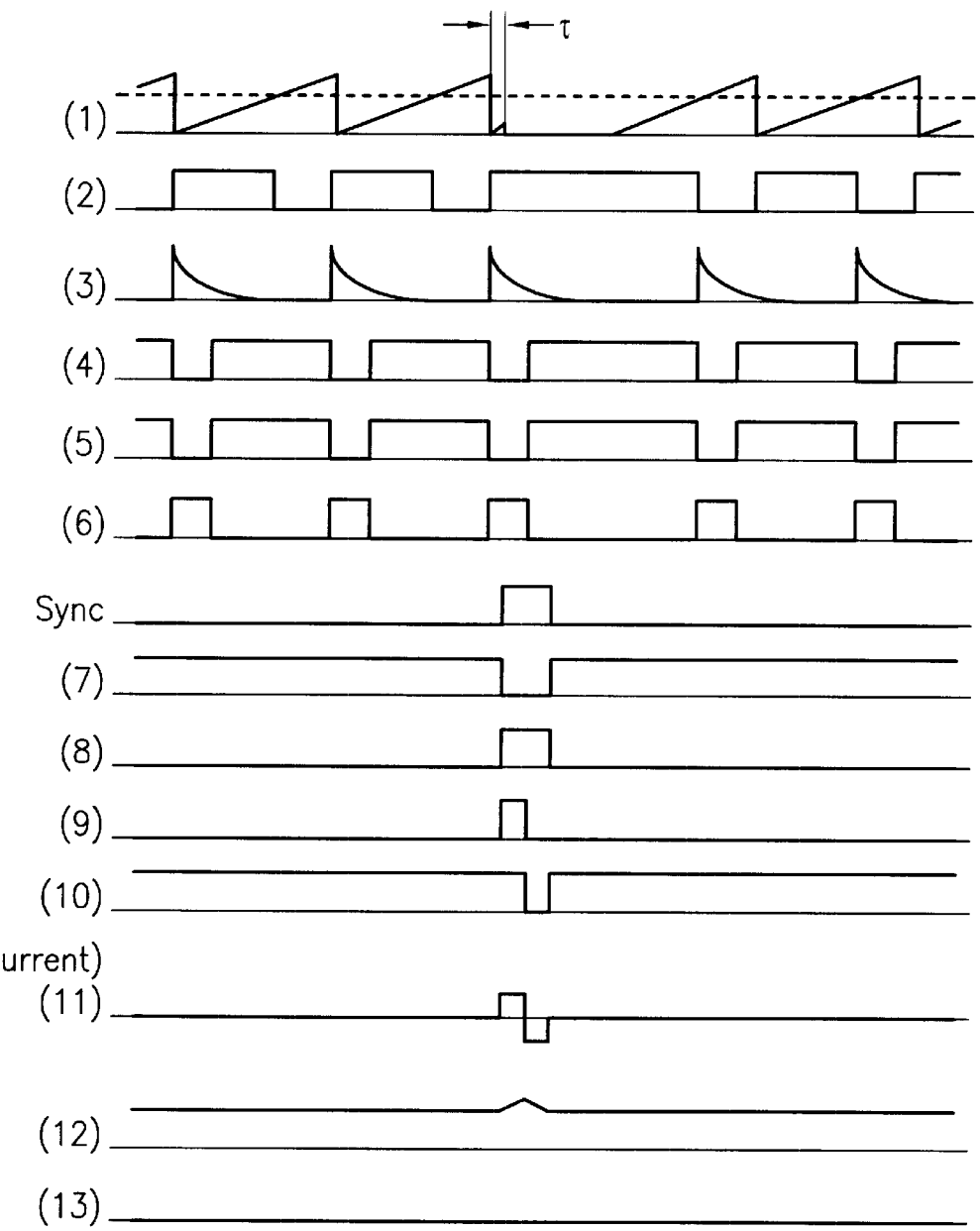
FIG. 7 is a diagram showing each part of the waveform in the matched phase state of the circuit shown in FIG. 6.
Figure 8:
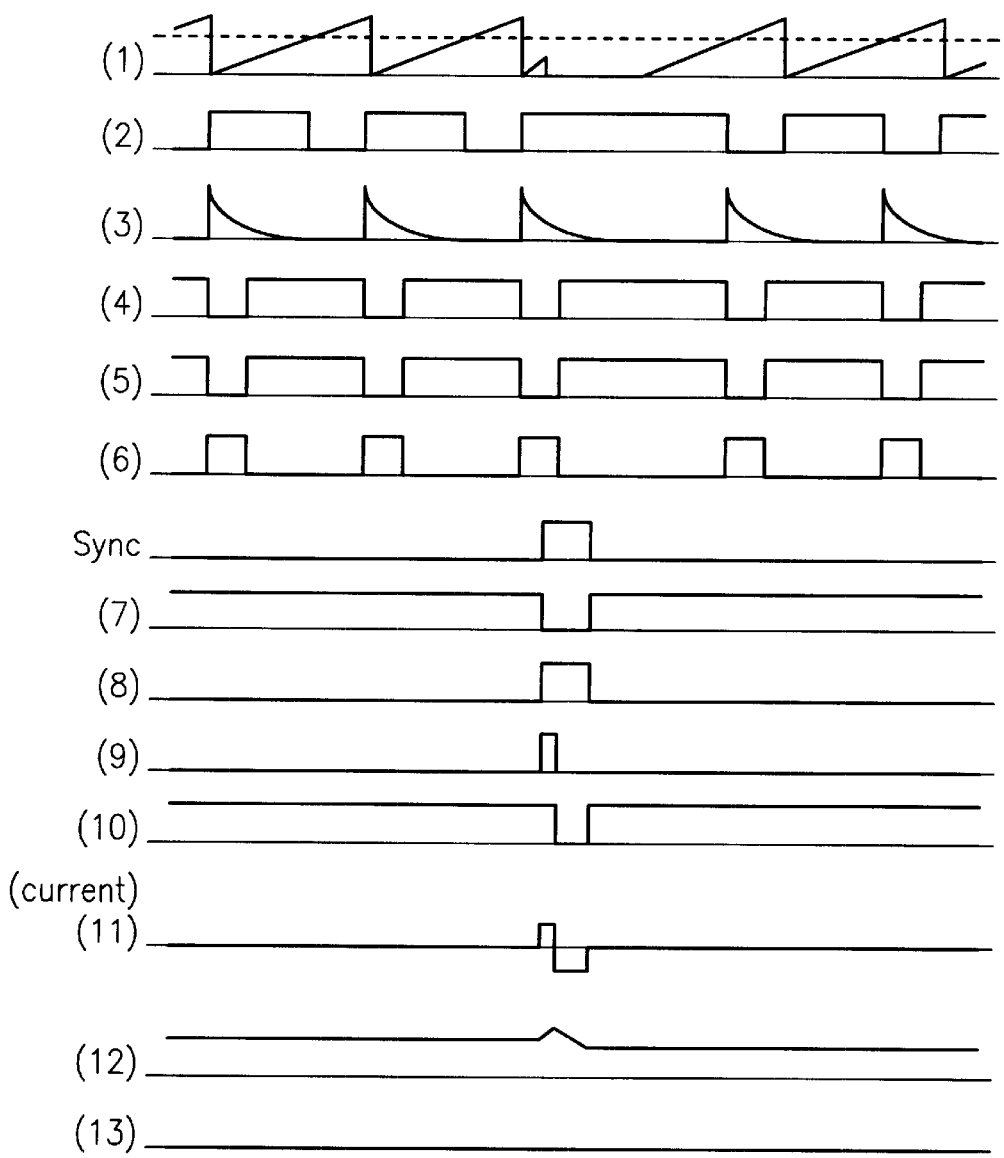
FIG. 8 is a diagram showing each part of the waveform in the phase advanced state of the circuit shown in FIG. 6.
Figure 9:
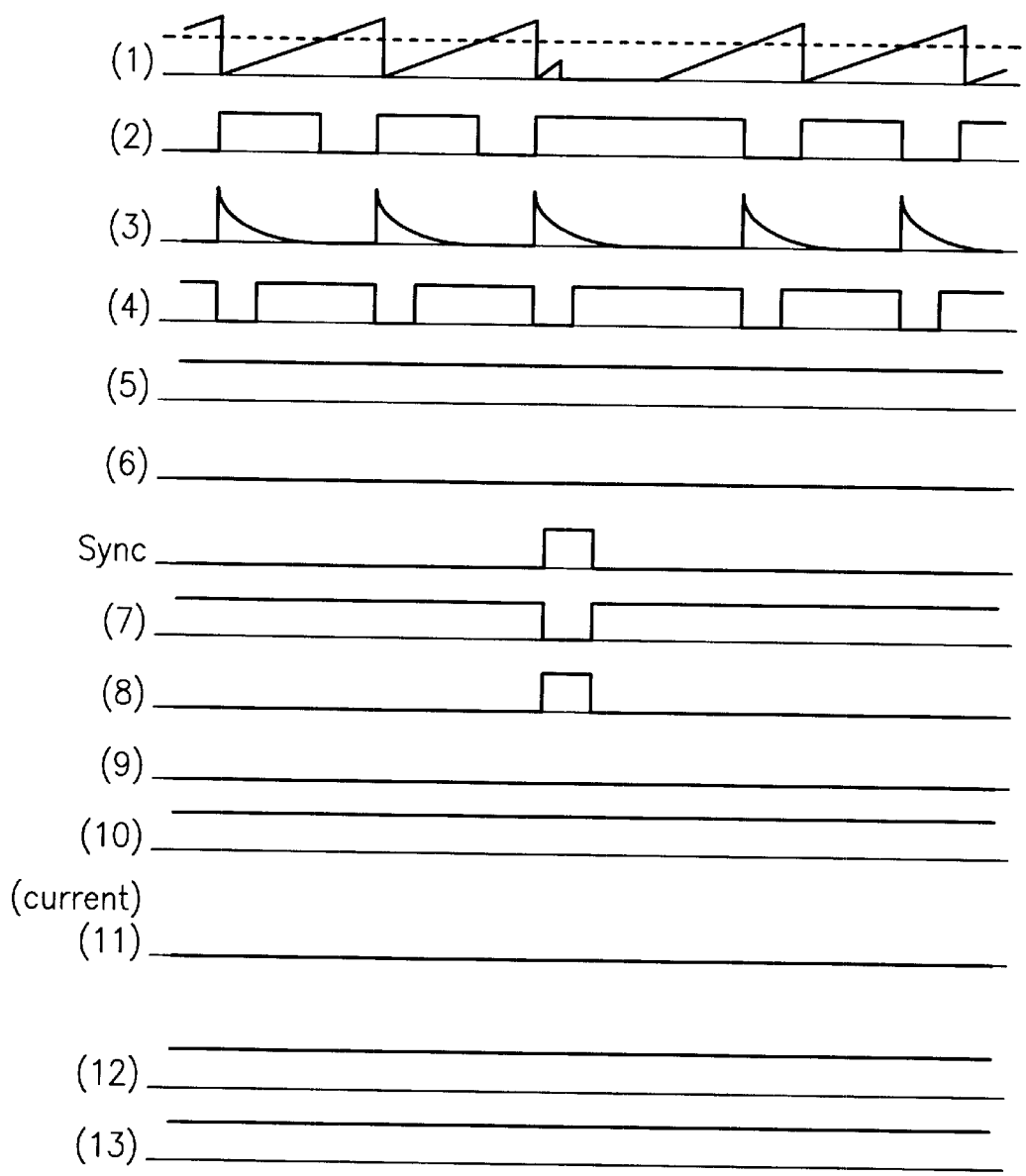
FIG. 9 is a diagram showing each part of the waveform in the interrupted state of the circuit shown in FIG. 6.

FIGS. 7, 8, and 9 are waveform diagrams showing the operation in FIG. 6. FIG. 7 is a waveform diagram showing the operation when the oscillation phase of sawtooth wave oscillator 11 and external synchronization signal Sync are in the matched phase state. (1) to (13) in the diagram show the waveforms at (1) to (13) in FIG. 6. Sawtooth wave oscillator 11 outputs sawtooth waves shown at (1) in FIG. 7. This oscillation signal is input to logic inversion circuit IC1 which generates high level output when the amplitude of the oscillation signal is at a lower than prescribed level. Accordingly, a pulse signal in (2) is output from logic inversion circuit IC1. The differentiation circuit including capacitor C11, resistor R12 differentiates the pulse signal shown in (2).

The output waveform is shown in (3) in FIG. 7. Logic inversion circuit IC2 outputs a pulse signal at (4) since logic inversion circuit IC2 generates low level output when the amplitude of the differentiated waveform of (3) exceeds a prescribed level. The output of logic inversion circuit IC2 is input to logic inversion circuit IC3 via resistor R13 if the output of logic inversion circuit IC6 is low level, as shown at (13), when start/stop signal ACT* is low level (starting state), and the waveforms on the input side and output side of logic inversion circuit IC3 adopt the forms of (5) and (6). The waveform of (6) is termed an internal phase signal, as mentioned above.

In FIG. 7, the pulse signal shown in (2) is differentiated, as mentioned above. The differentiated waveform is compared to a prescribed value in logic inversion circuit IC2, and a pulse signal shown in (4) is generated, thereby permitting the generation of a pulse signal of roughly fixed amplitude that is not dependent on the oscillation frequency of sawtooth wave oscillator 11. A mono-stable multivibrator may be used instead of the differentiation circuit and logic inversion circuit discussed above to generate a fixed-amplitude pulse. Transistor Q8 in FIG. 6 turns ON, as mentioned above, when external synchronization signal Sync is input at τ time after the sawtooth wave falls as shown in FIG. 7, capacitor C9 discharges and sawtooth wave oscillator 11 is initialized. Furthermore, the output of logic inversion circuit IC4 becomes low level, as shown in (7), and the output of logic inversion circuit IC5 becomes high level, as shown in (8). At this time, the potential on the anode side of diode D15 which comprises the discharge pump as mentioned above rises, as shown in (9), since the internal phase signal shown in (6) (output of logic inversion circuit IC3) is high level. As a result, current shown in (11) flows to capacitor C12 which comprises the current integration circuit via diode D15. The potential of capacitor C12 rises as shown in (12).

Next, once the internal phase signal shown in FIG. 7 (6) is low level (low level output of logic inversion circuit IC3) when the external synchronization signal is high level, the potential on the anode side of diode D15 falls, as shown in FIG. 7 (9). On the other hand, since the potential on the cathode side of diode D16 is low level when the output side of logic inversion circuit IC4 is low level, as shown in FIG. 7 (7), current flows out from capacitor C12 which comprises the current integration circuit via diode D16 and the potential of capacitor C12 falls, as shown in FIG. 7 (12). If the duration during which external synchronization signal Sync is high level and internal phase signal [FIG. 7 (6)] is high level is equal to the duration during which external synchronization signal Sync is high level and internal phase signal is low level, the integral values of the charge current and discharge current of capacitor C12 would be equal, and after the potential of capacitor C12 rises, as shown in FIG. 7 (12), they would decline by the same amount. As a result, the voltage that is input to the frequency controlled terminal of sawtooth wave oscillator 11 would not change, and the oscillation frequency of sawtooth wave oscillator 11 would not change. Specifically, when the oscillation phase of sawtooth wave oscillator 11 and external synchronization signal Sync are in a matched phase state, the device would operate so that the oscillation phase of sawtooth wave oscillator 11 and external synchronization signal Sync are in a prescribed phase relationship, and this state would steadily continue.

FIG. 8 is a diagram of the operating waveform when the oscillation phase of sawtooth wave oscillator 11 is in the phase advanced state relative to external synchronization signal Sync. (1) to (13) in the diagram show the waveforms at (1) to (13) in FIG. 6. If the oscillation phase of sawtooth wave oscillator 11 is in a phase advanced state relative to external synchronization signal Sync for any reason, the duration during which external synchronization signal Sync is high level and the internal phase signal [FIG. 8 (6)] is high level would be longer than the duration during which external synchronization signal Sync is high level and the internal phase signal is low level, as shown in FIG. 8.

Since capacitor C12 which includes the current integration circuit charges when external synchronization signal Sync is high level and the internal phase signal [FIG. 8 (6)] is high level, as mentioned above, and discharges when external synchronization signal Sync is high level and the internal phase signal is low level, the charge/discharge current of capacitor C12 in this case would be as shown in FIG. 8 (11), and the potential of capacitor C12 would fall, as shown in FIG. 8 (12). For this reason, the oscillation frequency of sawtooth wave oscillator 11 would fall and the amount of advance of the oscillation phase of sawtooth wave oscillator 11 relative to external synchronization signal Sync would decrease. Thus, the oscillation phase of sawtooth wave oscillator 11 and external synchronization signal Sync would revert to the matched phase state, as shown in FIG. 7.

Conversely, if the oscillation phase of sawtooth wave oscillator 11 should become retarded compared to external synchronization signal Sync, the oscillation frequency of sawtooth wave oscillator 11 would rise and the amount of retardation of the oscillation phase of sawtooth wave oscillator 11 relative to external synchronization signal Sync would decrease. For this reason, the oscillation phase of sawtooth wave oscillator 11 and external synchronization signal Sync would revert to the matched phase state, as shown in FIG. 7.

FIG. 9 is a diagram showing the operating state of each section when start/stop signal ACT* is high level and in the interrupted state. (1) to (13) in the diagram show the waveforms at (1) to (13) in FIG. 6. The output of logic inversion circuit IC6 becomes high level, as shown in FIG. 9 (13), when start/stop signal ACT is high level. For this reason, the input side of logic inversion circuit IC3 via diode D11 becomes high level, as shown in FIG. 9 (5), and the output side of logic inversion circuit IC3 becomes low level, as shown in FIG. 9 (6). Furthermore, the potential on the cathode side of diode D16 via diode D12 becomes high level, as shown in FIG. 9 (10). Accordingly, charge (discharge) current would not flow to capacitor C12 even if synchronization signal Sync is input.

In this state, fixed voltage is applied based on the differential voltage ratio of resistors R16, R17 to the frequency controlled terminal of sawtooth wave oscillator 11, and sawtooth wave oscillator 11 oscillates at a fixed frequency at this voltage. If external synchronization signal Sync is input when start/stop signal ACT* is low level, controlled operations take place as explained in FIG. 7 and FIG. 8, and this is controlled so that the oscillation phase of sawtooth wave oscillator 11 is phase locked to external synchronization signal Sync.

The present invention can be applied to so-called dielectric barrier discharge excimer lamps that generate ultraviolet light through excimer light emission using rare gases such as neon, argon, krypton, xenon, radon as well as mixtures and compounds of halogens such as arsenic, chlorine or bromine as the discharge gas sealed in lamp 1. In addition, metal vapors such as mercury or mixtures/compounds of these metal vapors with halogens termed metal halides may be effectively used. Any discharge gas that is used can be employed.

Needless to say, the detailed aspects of circuit operation explained in the present embodiments, for example, signal polarity, or inventive measures such as the selection of specific circuit devices, their addition, omission or modification for reasons of convenience of acquisition or economy, may be energetically pursued in the design of actual devices. In particular, measures such as inserting a monostable multiplexer if the pulse amplitude of synchronization signal Sync that is externally input should become problematic or if there is a possibility of the pulse amplitude fluctuating, shaping this to a form having a constant suitable pulse amplitude, or inserting a logic inversion circuit to correct disadvantageous polarity would fall within the scope of the present invention.

The inverter oscillator of a power supply device that supplies power to said dielectric barrier discharge fluorescent lamp in the present invention functions as a variable frequency oscillator, as explained above. It controls the variable frequency oscillator so that the oscillation signal from said variable frequency oscillator is phase locked with an external synchronization signal, thereby permitting lamp light emission to be synchronized with the external synchronization signal. In addition, fluctuation of the optical power due to overlapping of the external synchronization signal and oscillation phase of the oscillator can be prevented. For this reason, the light emission pulse number that participates in image readout becomes constant per processing cycle of an image input means such as a CCD. As a result, the brightness of the image that is read per processing cycle of an image input means such as a CCD does not change.

An internal phase signal in which the periodic amplitude is roughly constant is generated at a specific phase of oscillation of a variable frequency oscillator of an inverter, and the oscillation frequency of the frequency oscillator is controlled as a function of the length of the duration during which the effective duration of the external synchronization signal and the effective duration of the internal phase signal overlap and do not overlap. Accordingly, the oscillation phase of an inverter can be phase locked to the external synchronization signal without using a frequency divider. This permits the device to be produced inexpensively. Furthermore, the frequency range of the external synchronization signal is not restricted as a function of the variable range of the oscillation frequency of the variable frequency oscillator.

I claim:

1. A light source device for a dielectric barrier discharge fluorescent lamp that emits light utilizing ultraviolet light that is generated by dielectric barrier discharge, said light source device having a lamp operating circuit comprising:

a power supply device for supplying power to said dielectric barrier discharge fluorescent lamp, said power supply device including an inverter oscillator that functions as a variable frequency oscillator; and a variable frequency oscillator, an external input for receiving an external synchronization signal from a source that is external to said lamp operating circuit;

wherein said variable frequency oscillator is controlled so that the phase of an oscillation signal from said variable frequency oscillator is phase locked to said external synchronization signal, thereby permitting lamp light emission to be synchronized with the external synchronization signal.

2. A light source device for a dielectric barrier discharge fluorescent lamp that emits light utilizing ultraviolet light that is generated by dielectric barrier discharge, said light source device comprising:

a power supply device for supplying power to said dielectric barrier discharge fluorescent lamp, said power supply device including an inverter oscillator that functions as a variable frequency oscillator; and a variable frequency oscillator, wherein said variable frequency oscillator is controlled so that an oscillation signal from said variable frequency oscillator is phase locked to an external synchronization signal; and wherein said variable frequency oscillator produces an internal phase signal at a specific phase of oscillation and whose periodic amplitude is substantially constant.

3. The light source device of claim 2, wherein oscillation of said variable frequency oscillator is initialized by an external synchronization signal.

4. The light source device of claim 3, wherein a voltage of said variable frequency oscillator is controlled as a function of a length of a duration during which an effective duration of said external synchronization signal and an effective duration of said internal phase signal overlap and do not overlap.

5. The light source device of claim 4, wherein oscillation of said variable frequency oscillator is phase locked as a result of control of the oscillation frequency of said variable frequency oscillator.

* * * * *